(12) United States Patent
Basu et al.

(10) Patent No.: US 7,596,498 B2
(45) Date of Patent: Sep. 29, 2009

(54) MONITORING, MINING, AND CLASSIFYING ELECTRONICALLY RECORDABLE CONVERSATIONS

(75) Inventors: Sumit Basu, Seattle, WA (US); Mauricio Gonzalez de la Fuente, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 11/218,927

(22) Filed: Sep. 2, 2005

(65) Prior Publication Data

US 2007/0067159 A1  Mar. 22, 2007

(51) Int. Cl.
*G10L 21/00* (2006.01)
(52) U.S. Cl. ..................... 704/270
(58) Field of Classification Search .......... 704/270
See application file for complete search history.

(56) References Cited

U.S. PATENT DOCUMENTS

| | | | |
|---|---|---|---|
| 6,721,706 B1 * | 4/2004 | Strubbe et al. | 704/275 |
| 6,728,679 B1 * | 4/2004 | Strubbe et al. | 704/270.1 |
| 6,731,307 B1 * | 5/2004 | Strubbe et al. | 715/727 |
| 6,795,808 B1 * | 9/2004 | Strubbe et al. | 704/275 |
| 7,203,635 B2 * | 4/2007 | Oliver et al. | 703/22 |
| 7,487,094 B1 * | 2/2009 | Konig et al. | 704/270 |

OTHER PUBLICATIONS

Basu, S., "Conversational Scene Analysis," PhD., Thesis in Dept of EECS, Massachusetts Institute of Technology, Sep. 2002.
Breining, et al., "Acoustic Echo Control. An application of Very-High-Order Adaptive Filters," IEEE Signal Processing Magazine, Jul. 1999.

* cited by examiner

*Primary Examiner*—Susan McFadden
(74) *Attorney, Agent, or Firm*—Theodore M. Magee; Westman, Champlin & Kelly, P.A.

(57) ABSTRACT

Conversations that take place over an electronically recordable channel are analyzed by constructing a set of features from the speech of two participants in the conversation. The set of features is applied to a model or a plurality of models to determine the likelihood of the set of features for each model. These likelihoods are then used to classify the conversation into categories, provide real-time monitoring of the conversation, and/or identify anomalous conversations.

5 Claims, 11 Drawing Sheets

CALL MONITORING

| | | | |
|---|---|---|---|
| Short Status: OK<br>Long Status: Warning<br>Extension:9875 | Short Status: OK<br>Long Status: OK<br>Extension:9876 | Short Status: OK<br>Long Status: OK<br>Extension:9877 | Short Status: Warning<br>Long Status: Warning<br>Extension:9878 |
| Short Status: OK<br>Long Status: OK<br>Extension:9879 | Short Status: OK<br>Long Status: OK<br>Extension:9880 | Short Status: OK<br>Long Status: OK<br>Extension:9881 | Short Status: OK<br>Long Status: OK<br>Extension:9882 |
| Short Status: OK<br>Long Status: OK<br>Extension:9883 | Short Status: OK<br>Long Status: OK<br>Extension:9884 | Short Status: OK<br>Long Status: OK<br>Extension:9885 | Short Status: OK<br>Long Status: OK<br>Extension:9886 |
| Short Status: OK<br>Long Status: OK<br>Extension:9887 | Short Status: OK<br>Long Status: OK<br>Extension:9888 | Short Status: OK<br>Long Status: OK<br>Extension:9889 | Short Status: OK<br>Long Status: OK<br>Extension:9890 |
| Short Status: OK<br>Long Status: OK<br>Extension:9891 | Short Status: OK<br>Long Status: OK<br>Extension:9892 | Short Status: OK<br>Long Status: OK<br>Extension:9893 | Short Status: OK<br>Long Status: OK<br>Extension:9894 |
| Short Status: Warning<br>Long Status: OK<br>Extension:9895 | Short Status: OK<br>Long Status: OK<br>Extension:9896 | Short Status: Warning<br>Long Status: OK<br>Extension:9897 | Short Status: OK<br>Long Status: OK<br>Extension:9898 |

FIG. 10

CALL MONITORING

Telephone Professional: Max Frank

Call Length: 5 minutes, 28 seconds

Short Status: Abnormal

Long Status: Normal

Product: DKZ 3000

0:00  0:30  1:00  1:30  2:00  2:30  3:00

[ Listen to call ]

MONITORING, MINING, AND CLASSIFYING ELECTRONICALLY RECORDABLE CONVERSATIONS

BACKGROUND

Conversations between two people occur across channels that are electronically recordable in a number of different contexts. The most common contexts are face-to-face and over a telephone channel such as a public telephone network or a cellular telephone network. In some of these conversations, one of the participants is a communication professional such as an operator, a sales person, a support person, a reservationist, an insurance claims professional, an order placement operator, or an emergency services operator.

For such professionals, their job performance is determined in part by evaluating their conversations. This evaluation is typically performed by having a manager monitor a sampling of conversations to determine how well the conversations progressed and whether the professional followed guidelines as to information to be collected from the other party and information to be given to the other party.

In large call centers, a single manager may be required to monitor a large number of communication professionals. As a result, managers must listen to a large number of sample calls to evaluate the performance of all of the communication professionals.

The discussion above is merely provided for general background information and is not intended to be used as an aid in determining the scope of the claimed subject matter.

SUMMARY

Conversations that take place over an electronically recordable channel are analyzed by constructing a feature from the speech of two participants in the conversation. The feature is applied to a model to determine a likelihood for the feature. The conversation is flagged as containing an anomaly based on the likelihood for the feature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

FIG. 10 is a screen shot of a call monitoring screen.

FIG. 11 is a screen shot of a call monitoring screen with a details window.

DETAILED DESCRIPTION

Embodiments described herein use features constructed from the speech of at least two participants in a conversation held over an electronically recordable channel to determine how well the conversation fits one or more models. The communication channel can include a telephone network such as a hard line network or a cell phone network, a voice over IP channel, a video teleconference channel, a radio channel, a satellite channel, or open air (as in a face-to-face conversation). In addition, the electronically recordable channel can include combinations of these types of channels.

Typically, such conversations will involve a communication professional talking to a third party. Examples of communication professionals include operators, sales persons, support persons, reservationists, order placement operators, insurance claims operators, dispatchers and emergency service operators. Those skilled in the art will recognize that other communication professionals are possible and that the list above is just a subset of all possible communication professionals. Embodiments described below allow for conversations to be analyzed so that the performance of the communication professional may be evaluated on a real-time basis or at a later date.

In many communication systems, the communication professional is provided with a phone station that provides voice and/or video and that provides a data entry system to allow the professional to enter caller information in order to fulfill a transaction between the caller and an entity that the communication professional represents. For example, a sales person would record shipping and billing information for the caller as well as product information indicating which product the caller wishes to purchase. An emergency services operator would record the caller's calling information as well as the nature of the emergency. This information could then be used to direct emergency services to the caller's location. Such phone stations are often constructed using a personal computer, such as the personal computer shown in FIG. 1.

Figure 1:
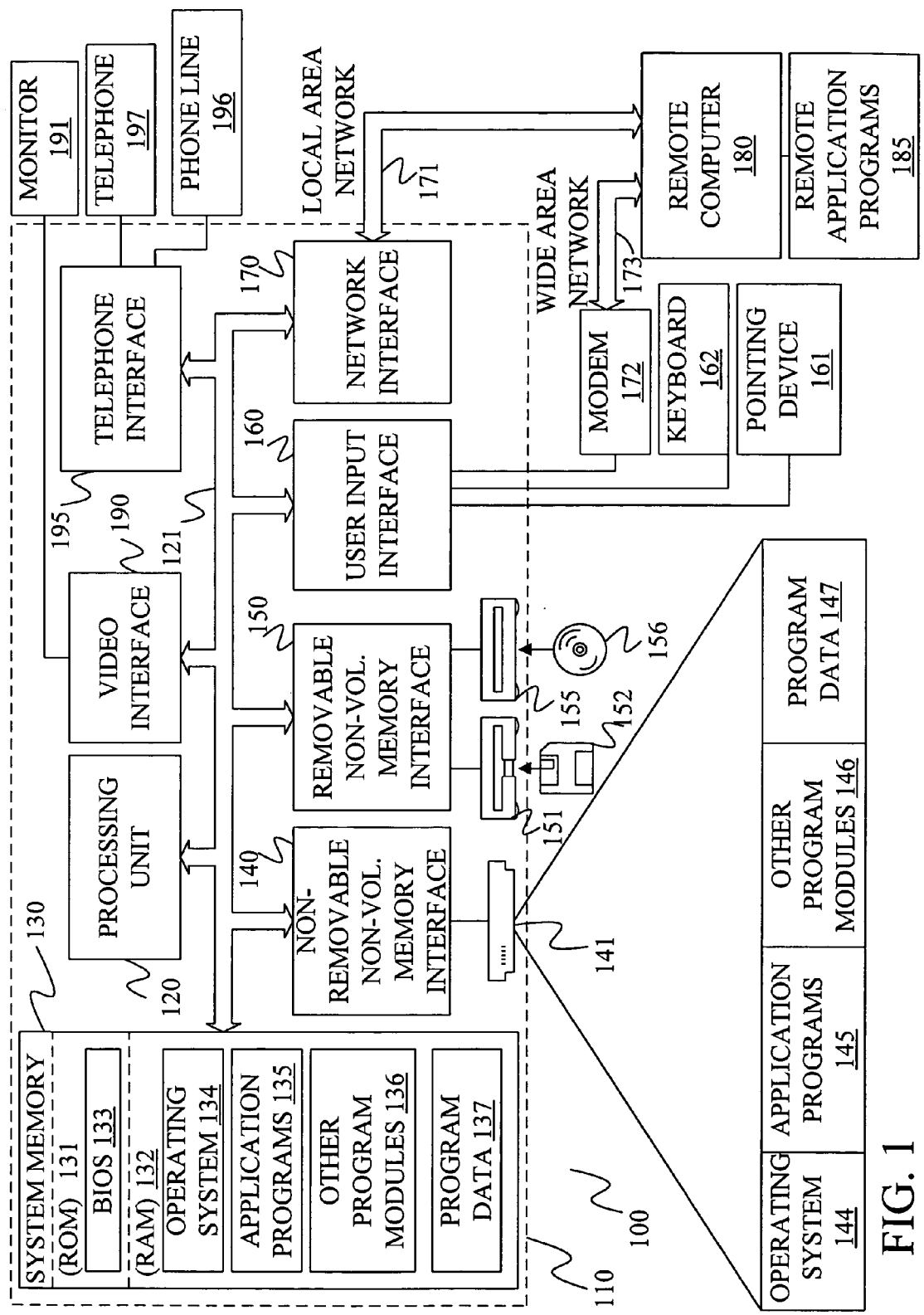
FIG. 1 is a block diagram of a computing device, which may be used as a phone station.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190.

Computer 110 also includes a telephone interface 195 that receives a telephone line 196 and a telephone handset 197. Telephone interface 195 translate signals to and from phone line 196 so that voice signals on phone line 196 may be routed to telephone handset 197 and speech signals on telephone handset 197 are placed in the proper form for phone line 196. In some embodiments, telephone interface 195 converts the speech signals from the user of the handset and from the phone line into digital packets that can be stored on computer 110 or transmitted through a network connection to other computing devices.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet. Telephone interface 195 may be connected to a telephony network through a network interface and may receive and deliver speech signals along that interface.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
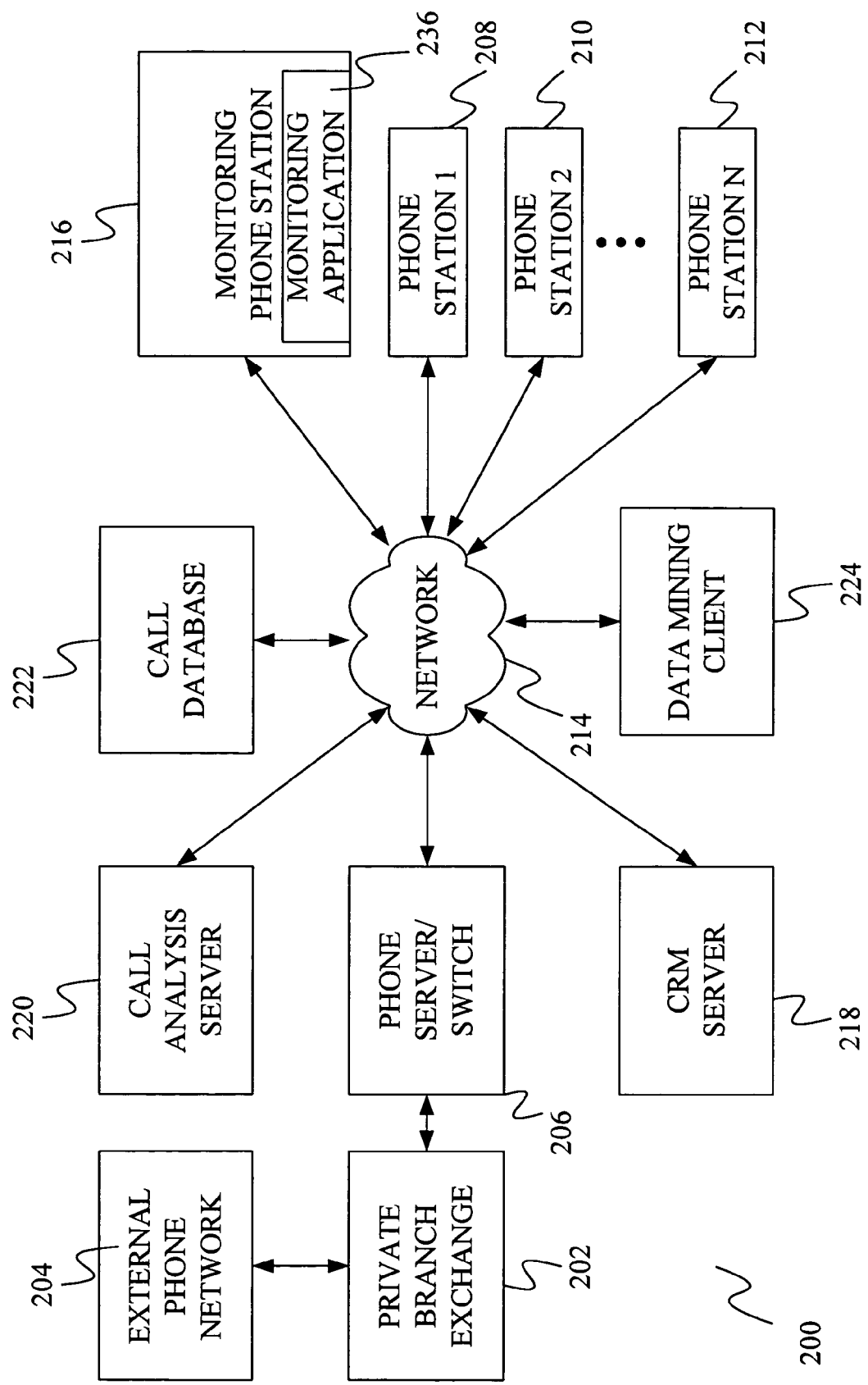
FIG. 2 is a block diagram of a call center.

The phone station of FIG. 1 can be used as part of a call center as shown in the block diagram of FIG. 2. In FIG. 2, a call center 200 is connected through a private branch exchange 202 to an external phone network 204. Call center 200 is connected to private branch exchange 202 by a phone server/switch 206, which routes telephone and/or video data between private branch exchange 202 and one or more phone stations 208, 210 and 212. In many systems, the phone and/or video data is passed to the phone stations through a network 214. In other embodiments, the phone stations 208, 210 and 212 are connected directly to phone server/switch 206. Phone server/switch 206 also allows a monitoring phone station 216 to monitor conversations occurring on any of the phone stations 208, 210 and 212. Further, phone server/switch 206 allows monitoring phone stations 216 to take control of a phone conversation and/or redirect the phone conversation to another phone station.

Phone stations 208, 210 and 212 also receive customer relations management (CRM) applications and/or data from a customer relations management server 218 through network 214. These applications and data are used by the communications professional to retrieve data and to enter new data related to the call. Although CRM server 218 is shown connected to phone stations 208, 210 and 212 through network 214, a separate network may be provided for such a connection so that the phone data is transferred to phone stations 208, 210 and 212 through a separate phone network from the network used to transfer CRM data.

A call analysis server 220 receives conversation data from phone stations 208, 210 and 212 and/or phone server/switch 206 through network 214. The conversation data can include just the speech signals present in the conversations or may include features generated by the phone stations based on the speech signals. Call analysis server 220 uses the conversation data to analyze the conversations and in some embodiments to provide real-time feedback to the phone stations and/or monitoring phone station 216 indicating how well the conversation data fits one or more models of conversations, or that it does not fit any of the models (i.e., an anomalous conversation). In particular, the feedback can be provided to a monitoring application 236 in monitoring phone station 216, which is capable of monitoring a plurality of conversations taking place in call center 200.

Data concerning conversations such as the word content of the speech signals, additional information entered during the conversation (e.g., notes typed in by either party, etc.) and the classification of the conversation or classification of parts of the conversation may be stored in a call database 222. Call database 222 allows a data mining client 224 to review past calls including a review of the analysis of the calls.

Under one embodiment, call analysis server 220 analyzes conversations to determine how well the conversation matches a model for a conversation. Call analysis server 220 then indicates whether the conversation matches the model, either in real-time to a phone station or a monitoring phone station or in an entry for the conversation in call database 222.

Figure 3:
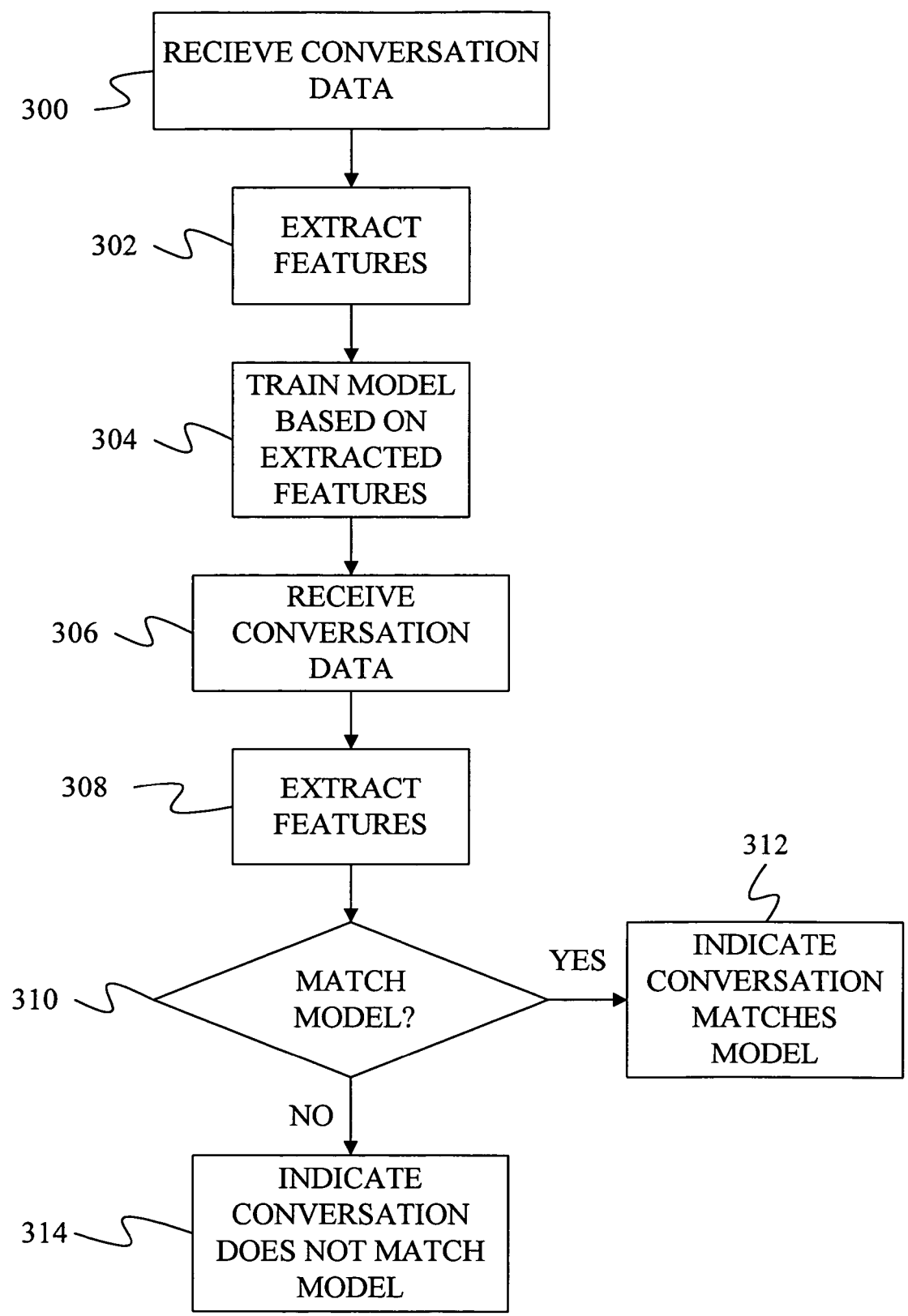
FIG. 3 is a method of identifying anomalies in a conversation over a channel.
Figure 4:
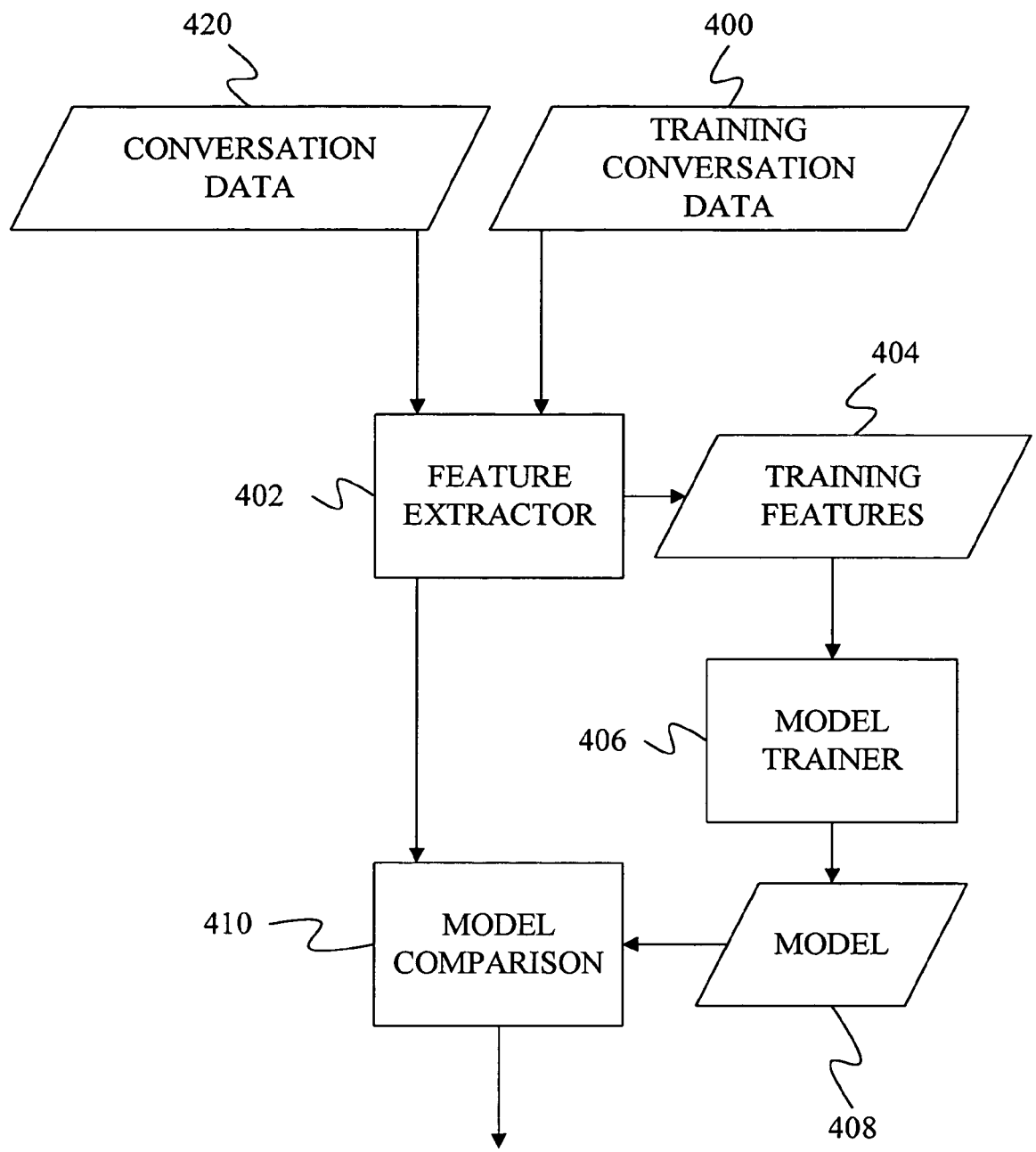
FIG. 4 is a block diagram of elements used in the method of FIG. 3.

FIG. 3 provides a flow diagram of a method for determining whether a conversation matches a model. FIG. 4 provides a block diagram of elements used to determine whether a conversation matches a model.

In step 300, training conversation data 400 representing a conversation of the type to be modeled is received. Typically, the selection of training conversation data that fits the model is made by listening to conversations and selecting those conversations that have desirable characteristics. Many different types of models representing different characteristics may be used. For example, the characteristics can include characteristics that make for a "good" conversation or characteristics that indicate that a conversation is contentious, chatty, argumentative, heated, aggressive, or shows a lack of comprehension or some other negative conversation style.

Under some embodiments, the conversation data is first received in the form of a phone line signal that contains the speech of the communications professional and the third party caller. In such cases, the communication professional's speech is divided from the third party caller's speech by a channel divider to produce a communication professional's channel and a third party caller channel.

In some embodiments, where there is only a single (mono) channel with both speakers' voices available, this channel division is performed using automatic speaker identification methods, which identify the segments of the signal belonging to each speaker. In other embodiments, where it is possible to get an additional signal representing one of the speakers' voices in isolation, this channel division can be performed using automatic echo cancellation algorithms. In automatic echo cancellation, the transformation between the channel containing both speakers and the channel containing just one speaker in isolation is estimated. The single-speaker signal is then transformed according to this transformation and the result is subtracted from the signal that contains both speakers. In some embodiments of such automatic echo cancellation setups, the isolated speech of the communication professional is captured using hardware that separates the signal before it is placed on a shared phone line, which also contains the third party caller's speech. In other embodiments, the communication professional's speech and the other participant's speech are maintained on separate channels within the communication system. For example, in voice over IP systems, packets containing speech data for the two participants in the conversation have different headers.

After receiving training conversation data for the two participants in the conversation, features from the conversation data are extracted by a feature extractor 402 at step 302. A large number of different features may be used under the present invention. In general, the features provide information on the interaction between the participants of the conversation and do not generally focus just on one participant. Using information from both participants provides greater information for determining whether the conversation fits within a given model. Examples of possible features are defined below.

Speaking Rate

Speaking rate is a determination of how fast each participant of the call is speaking. Speaking rate may be characterized in two pieces: the articulation rate, which is how fast the speaker is producing phonemes during a production burst, and the production rate, which is how fast the speaker is moving from one production burst to the next. The articulation rate tends to be constant among speakers during natural speech, while the production rate varies greatly according to cognitive load, mood, and so on.

Under one embodiment, the articulation rate is estimated as the ratio of the amount of time spent in voiced speech segments over the total amount of time spent in speech segments in a speech signal. Many systems have been developed for detecting which segments of a signal contain speech and for detecting which of those speech segments contain voiced speech rather than unvoiced speech.

One example is a system that uses auto-correlation, which provides a measure of the similarity of a frame of audio to time-shifted versions of itself. In frames of speech that are voiced, the signal within the frame will be periodic, resulting in large peaks in the auto correlation for those frames. The number of peaks and the size of the peaks can thus be used to distinguish a voiced segment from an unvoiced segment. Further, the spectral entropy of a frame can also be used to segment a speech signal into voiced and unvoiced segments. In general, unvoiced frames have higher entropy than voiced frames.

In addition, several techniques have been developed in the prior art for identifying which frames contain speech. Taking the ratio of voiced frames over speech frames, the articulation rate can be determined. The time between successive speech segments, in other words the length of non-speech segments, is used to determine the production rate, with longer periods of non-speech representing slower production rates.

Pitch

The mean, variance and rate of change of the pitch of each participant's voice can also be extracted from the speech signals. There are many pitch trackers of the prior art that may be used to identify these features of the pitch. For example, the pitch of a frame can be identified by examining the auto-correlation of a voiced frame. In such auto-correlation signals, peaks will appear at multiples of the pitch period, usually with the largest peak representing the actual pitch period. After the pitch has been identified for each of the frames, the mean, variance and rate of the change of the pitch across the frames can be determined.

Energy/Emphasis

The mean, variance and rate of change of the energy of each participant's speech can also be used as a feature. These values can be determined across collections of frames for each of the participants.

Overlapping Speech

Overlapping speech refers to segments in which both participants are speaking at the same time. Such segments can be identified by time aligning the speech signals from the two participants and finding regions in which both speakers are speaking (based on speech detection as described earlier). The amount of overlapping speech can be an important feature in determining the nature of a conversation. For instance, in a fight, there may be a large amount of overlapping speech, whereas a situation where an employee is speaking to an upper manager will tend to have very little overlapping speech.

Speaker Changes

Every time a different speaker begins speaking, a speaker change occurs. This does not necessarily correspond to the end of a sentence or phrase—for instance, the second speaker could simply say "uh-huh" in the middle of the first speaker's sentence, which would count as two speaker changes (from 1 to 2 and then from 2 to 1). Note that the time between speaker changes (i.e., during which only one participant is speaker) is referred to as a turn.

Interruptions

The number of interruptions represents the number of speaker changes in which the speaker forcibly started speaking before the other participant had finished. Interruptions can be identified by time aligning the speech signals from the two channels for the participants and identifying when each participant is speaking. Those transitions that are preceded by overlapping speech (both participants speaking at the same time) are generally interruptions.

Dominant Speaker

Dominant speaker features identify whether one of the participants in the conversation is "holding the floor" by speaking for long periods of time without interruption by the other participant. Dominant speaker features can include who the dominant speaker is, the total length and average length (per dominating region) of time they "hold the floor" and the length of speech segments from the other participant between dominant speaker periods.

Pause Structure

Pause structure provides features on silent periods in the conversation. In particular, it indicates the length of pauses during transitions from one speaker to another and the length of pauses between utterances by a single participant in the conversation. Such a feature can give an indication of "awkward" silences in the conversation, lack of comprehension, one participant thinking about how to respond to the other, and other such phenomena.

Scene Features and Classification

Contiguous portions of conversations with a consistent dominant speaker are referred to as scenes. Likewise, the features representing the behavior of the participants over the course of a scene are referred to as scene features. The scenes can be grouped into classifications based on these features. For instance, though a given speaker is dominating, the other may be constantly interrupting, completely silent, asking occasional questions, frequently or infrequently backchannel (saying "uh-huh", "ok", etc.). Based on these behaviors we can classify the scenes into categories such as quietly listening, showing interest, argumentative, etc.

Scene Histograms

Scene histogram features represent the aggregation of scene feature and classification information over an entire conversation or over a longer segment of conversation containing multiple scenes. For instance, the histogram can represent the amount of time spent in each scene category (speaker A dominating, speaker B quietly listening, etc.)

Conversation Classification

Based on the distribution of scene-level features, we can describe the entire conversation at a macro level. For instance, an informal chat will have many short scenes from both parties, while an information delivery situation will tend to contain a few long scenes dominated by the participant delivering the information.

The features described above are a sampling of features that can be used during call analysis. In addition, combinations of these features may be used during call analysis to construct one or more models used in identifying whether a conversation fits a particular model of conversation.

Once the features have been extracted at step 302, the extracted features are provided as training features 404 to a model trainer 406, which trains a conversation model 408 based on the features at step 304. Under one embodiment, model 408 is a mixture of Gaussians, with a separate Gaussian distribution for each type of feature. For each Gaussian in the mixture, a mean and variance is determined from training features 404. In many embodiments, model 408 is communication-professional specific such that only training data involving a single communication professional is used to train the model. In other embodiments, model 408 represents a combined model formed across multiple communication professionals.

At step 306, conversational speech data 420 is received by feature extractor 402. This conversation speech data represents an actual conversation that is to be examined to determine if it fits model 408. At step 308, feature extractor 402 generates features that are provided to model comparison 410. At step 310, model comparison 410 compares these features to model 408 to determine a likelihood for the features given model 408. If the detected features provide a high likelihood given model 408, model comparison 410 indicates that this conversation fits the model at step 312. If the features provide a low likelihood given model 408, model comparison 410 indicates that the conversation does not fit the model at step 314. As discussed further below, the indication that the conversation does or does not match a model can be stored in a database for the conversation or may be indicated to a manager or to the communication professional through a user interface.

Figure 5:
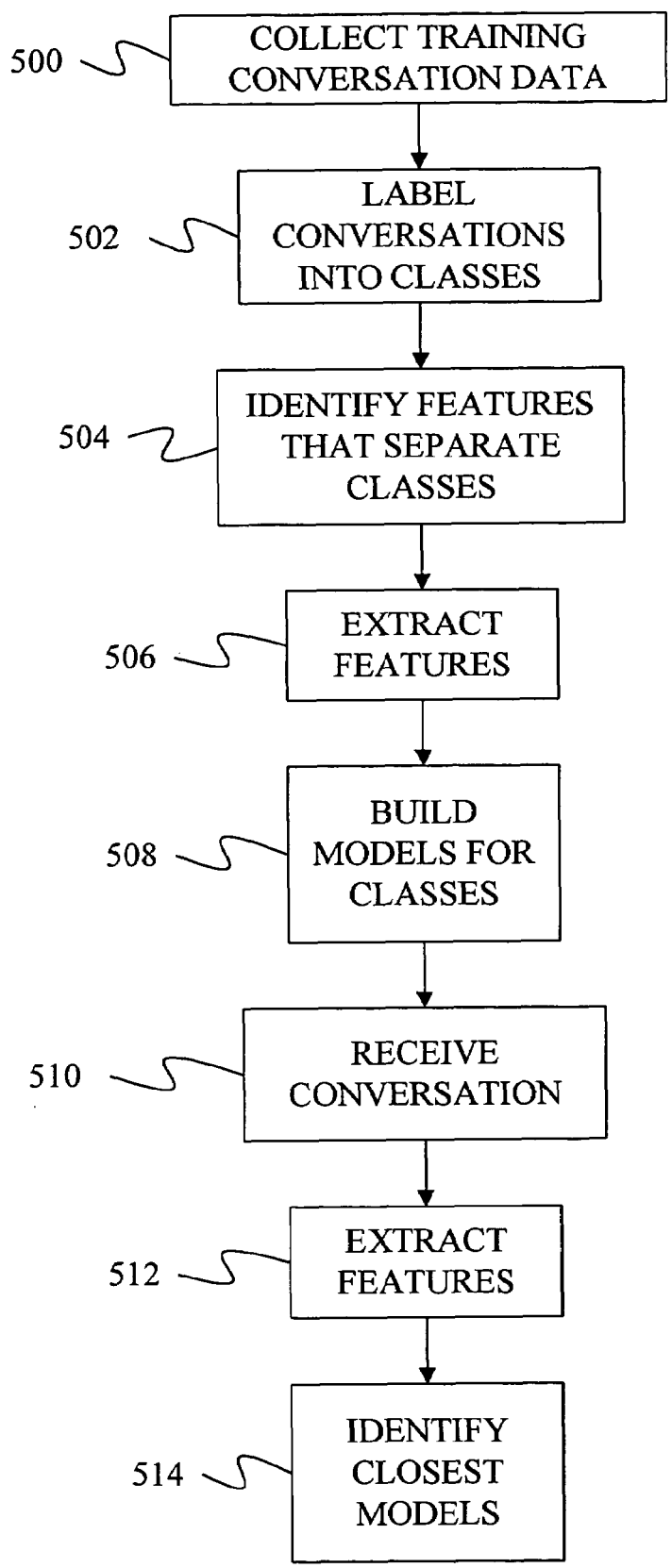
FIG. 5 is a method of classifying conversations.
Figure 6:
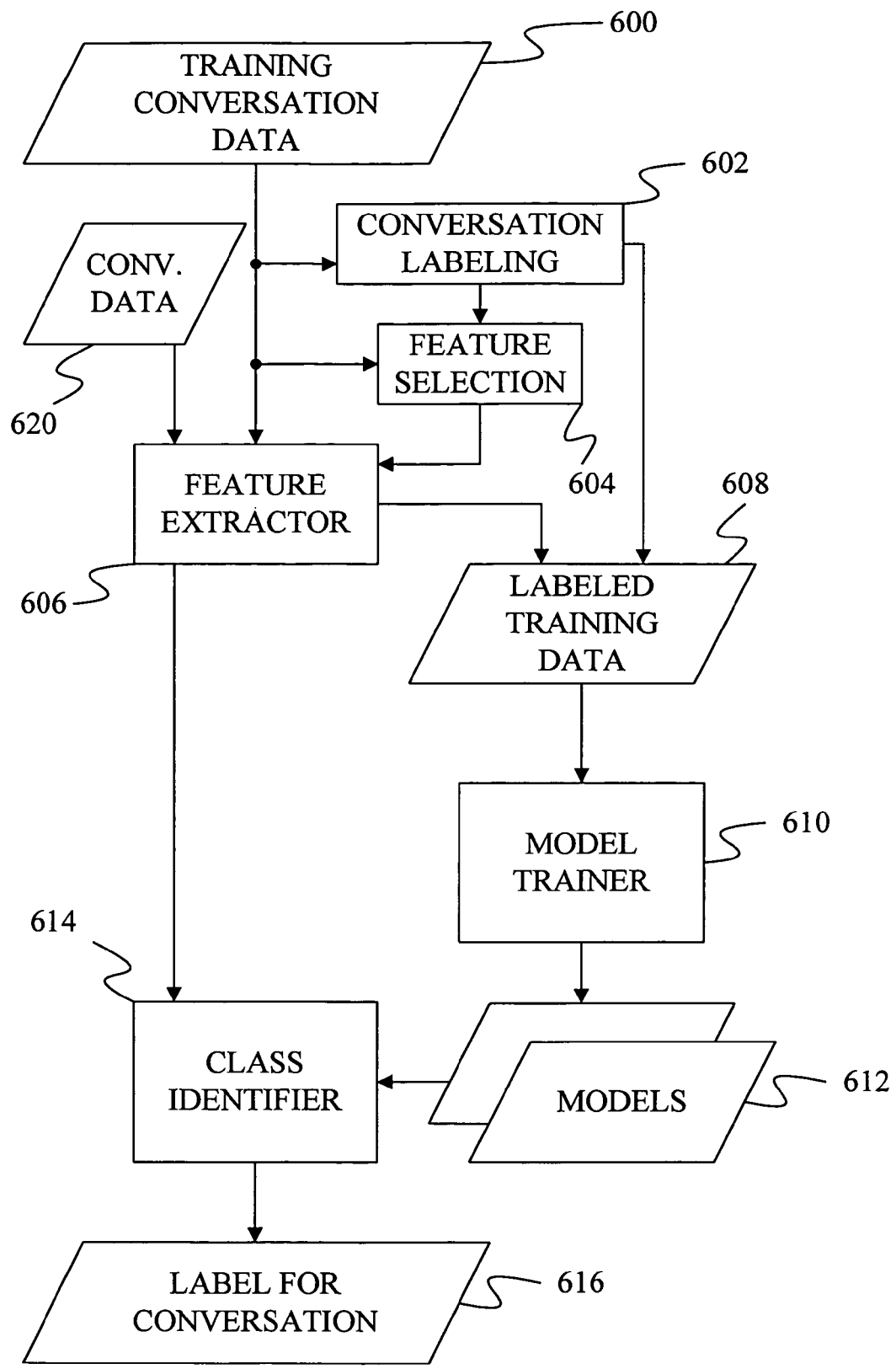
FIG. 6 is a block diagram of elements used in the method of FIG. 5.

FIGS. 5 and 6 provide a flow diagram and block diagram wherein models are trained and used to classify conversations. At step 500, training conversation data 600 is collected. At step 502, each conversation is labeled into one or more classes by conversation labeling 602. Such conversation labeling can be performed by hand. These classes can include normal conversations, argumentative, accent unintelligibility, conversation style mismatch, confusion, angry interaction, dissatisfaction, and others.

At step 504, labels for the conversations and the data for the conversations are provided to a feature selection 604, which extracts features from the data and determines which features are most helpful in identifying classes. Under one embodiment, a mutual information technique is used to identify the features that provide the best information for separating conversations into classifications.

At step 506, the selected features from feature selection 604 are used by feature extractor 606 to extract training features forming part of labeled training data 608. The other part of labeled training data 608 is the label for the conversation.

At step 508, model trainer 610 builds models 612 for each class using labeled training data 608. Under one embodiment, a separate model is formed for each class of conversation.

At step 510, conversation data 620 is received. At step 512, feature extractor 606 extracts the features selected by feature selection 604 during training. The extracted features are provided to a class identifier 614, which identifies the model of models 612 that best matches the extracted features at step 514. Under one embodiment, this is done by identifying the model that provides the highest likelihood for the extracted features. The associated label for the selected model is then associated with the current conversation as label 616. This classification can be stored with the conversation data in the database, or may be provided to a monitoring application such monitoring application 236 or may be provided to the phone station of the communication professional in real-time.

Figure 7:
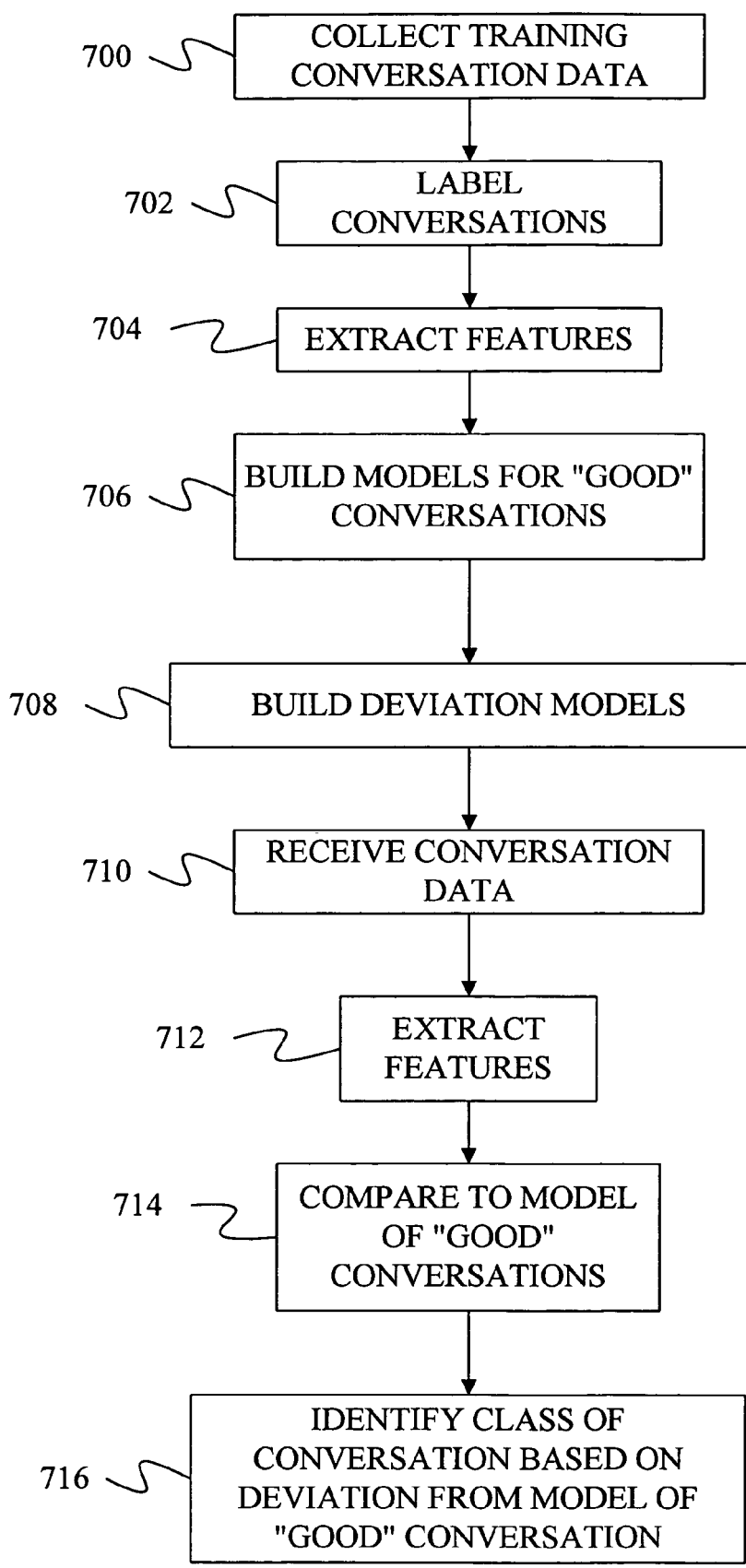
FIG. 7 is an alternative embodiment of a method of identifying a class for a conversation.
Figure 8:
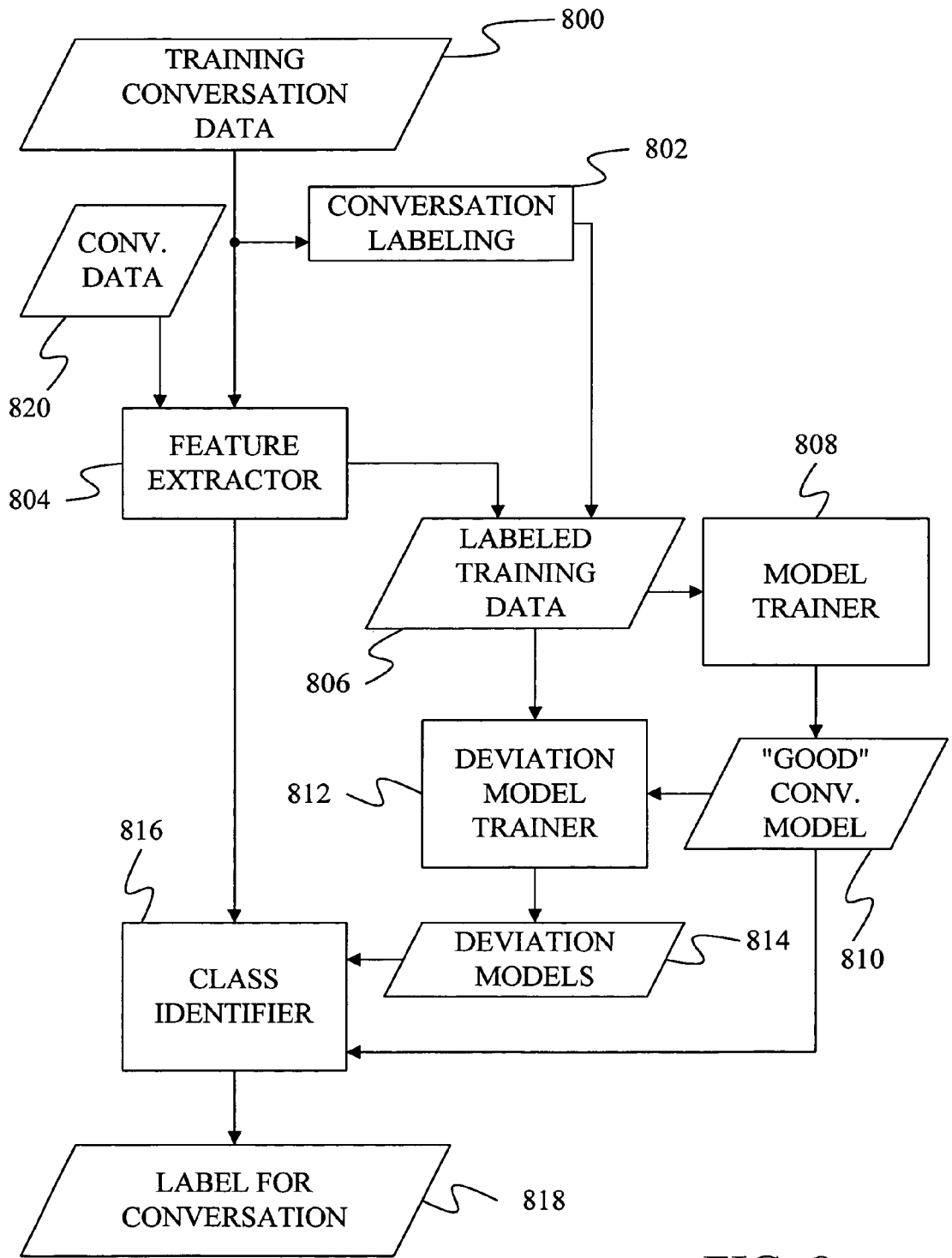
FIG. 8 is a block diagram of elements used in the method of FIG. 7.

FIG. 7 provides a flow diagram and FIG. 8 provides a block diagram of elements used in another embodiment of the present invention for analyzing conversations. In the embodiment of FIGS. 7 and 8, a conversation is classified based on how it deviates from a model of good conversations.

In step 700 of FIG. 7, conversation training data 800 is collected. The conversations in conversation training data are labeled at step 702 through conversation labeling 802. At step 704, features are extracted using feature extractor 804 and the extracted features are combined with the conversation labels to form labeled training data 806.

At step 706, model trainer 808 uses the training data that is labeled as part of "good" conversations to build a "good" conversation model 810. In general, a "good" conversation may not be perfect but is considered an acceptable or normal conversation. In some embodiments, the "good" conversation model 810 is a mixture of Gaussians model.

At step 708, a deviation model trainer 812 uses "good" conversation model 810 and labeled training data 806 to form deviation models 814. Each deviation model is associated with a separate class of conversation and indicates the way in which the features associated with the conversation class deviate from "good" conversation model 810. For example, pitch features may be higher for angry conversation classes than for the "good" conversation model. Thus, deviation models 814 provide the mean degree and direction of deviation from the "good" conversation model for each class of conversation.

At step 710, conversation data 820 is received and its features are extracted at step 712 by feature extractor 804. The extracted features are provided to class identifier 816, which compares the features to the "good" conversation model at step 714. This comparison involves identifying deviations between the features and the "good" conversation model. At step 716, class identifier 816 applies the identified deviations to deviation models 814 to determine which deviation model (e.g., "argument") best matches the identified deviation. The label associated with the model that best matches the identified deviation is then used as label 818 for the conversation. Note that class identifier 816 will identify a conversation as a "good" conversation if the features provide a small deviation from the "good" conversation model and do not match any of the deviation models 814 well.

The classification of the conversations described above can be stored with the conversations and can later be used for a number of purposes. In particular, the conversations associated with a particular communication professional can be examined to identify those conversations in which anomalies were detected. A manager can then review those conversations with the communication professional as part of reviewing the performance of the communication professional. By providing the analysis based on the interaction between the communication professional and the caller, the analysis of the conversations is able to help the manager identify those calls that are outside the norm for the communication professional so that more attention can be spent on correcting problems that cause the call to be outside of the norm.

Figure 9:
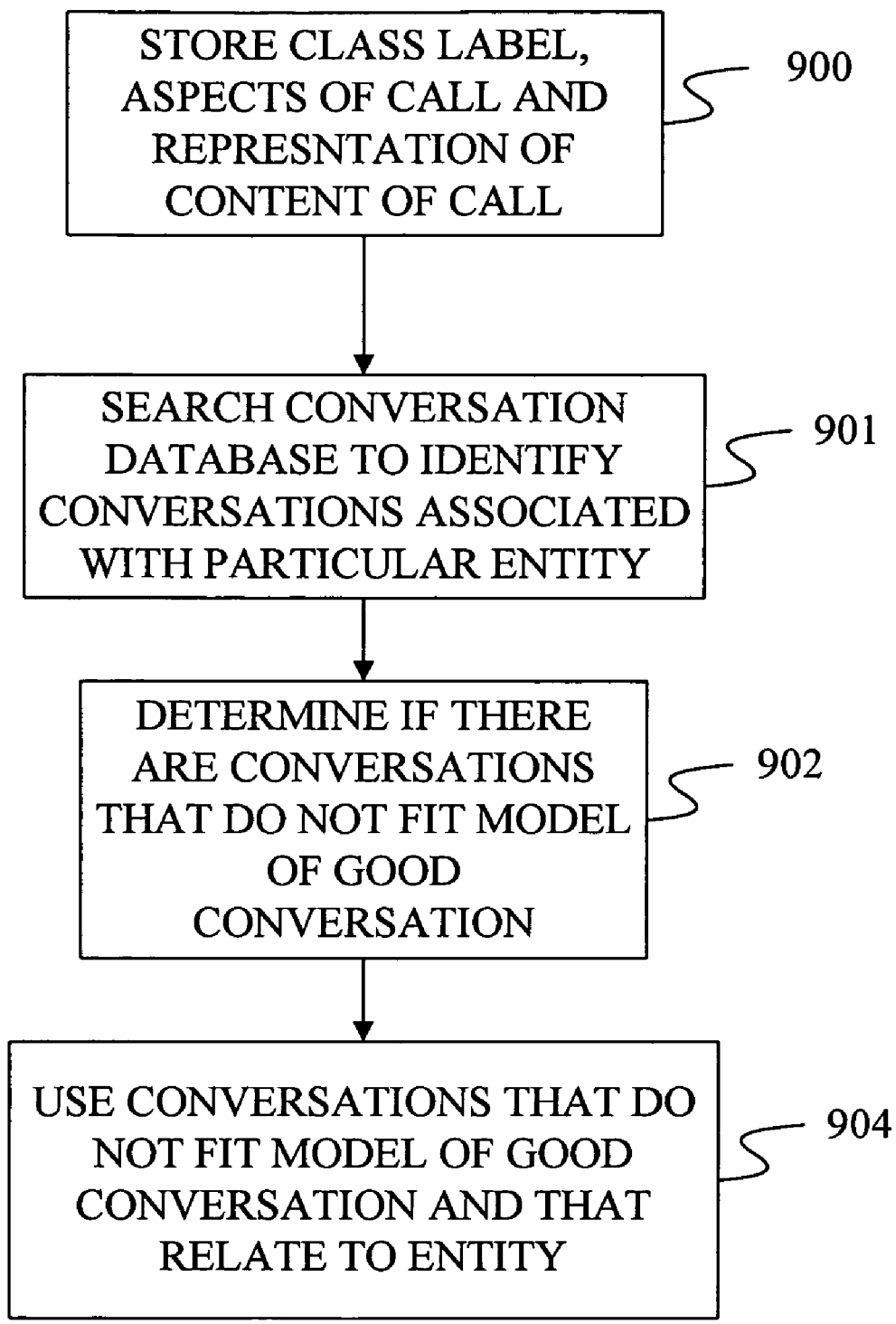
FIG. 9 is a flow diagram of a method of mining data from stored conversations.

The conversations may also be mined for data relating to particular entities such as products, policies, or employees. FIG. 9 provides a flow diagram of one method for mining the data associated with conversations that have been analyzed.

At step 900 of FIG. 9, a representation of the content of the conversation and the class label for the conversation are stored in a database, such as database 222. The representation of the content of the conversation can be values representing the speech signals of the two participants in the conversation or a transcript of the words spoken by the participants. In addition, information describing aspects of the call such as what product the call was about, the communication professional that handled the call, and the length of the call may also be stored.

At step 901, the conversation database is searched to identify conversations associated with a particular entity. For example, in the call center embodiment of FIG. 2, call database 222 would be searched. At step 902, a determination is made as to whether there are any conversations that do not fit the model of a good conversation. At step 904, those conversations that do not fit the model for a good conversation are used to identify problems in the handling of the conversation or problems with a particular entity. For example, calls in which a large number of consumers are angry about a product can be analyzed to determine problems with the product. This reduces the number of calls that must be listened to by a product support team because only those calls in which there were anomalies in the conversation are reviewed.

The information as to whether the conversation fits within a good conversation model can also be used for real-time feedback, both for a manager who is monitoring calls and for the telephone professional themselves. Using this feedback, a manager can intervene in a call to correct the problem with the call. Such intervention can include transferring the call to another professional who may have a speaking style that is more aligned with the caller.

FIG. 10 provides a screen shot of a display showing feedback for 24 telephone calls that is provided to a manager who is monitoring the calls. Such a display can be produced by a monitoring application such as monitoring application 236 of FIG. 2. Each call is found within a separate status box such as status box 1000. Within each status box, an extension number associated with a telephone professional, a short-term status of the call and a long-term status of the call are provided. The short-term status indicates whether the conversation over some recent time span fits the good conversation model. The long-term status indicates whether the conversation as a whole from its beginning until now fits within the good conversation model. For example, in box 1000, for extension 9895, long term status 1002 indicates that the conversation is within the good conversation model and short-term status 1004 indicates that the conversation over the recent time period is not within the good conversation model. This could indicate that the conversation has suddenly taken a turn outside of the scope of a good conversation.

Under some embodiments, the short-term status and the long-term status are determined from different conversation models. Thus, there is a short-term good conversation model and a long-term good conversation model. Each of these models in turn may be trained using different sets of features. In other embodiments, the short-term conversation model and the long-term conversation model are the same model evaluated using different collections of features. Thus, features across a small time period would be applied against the model to determine the short-term status and features across a longer segment or the entire conversation would be applied against the model to determine the long-term status.

The display shown in FIG. 10 may be augmented with colors. For example, using red when a call is outside of the good call model and using green when the conversation is within the good conversation model. In other embodiments, a simple color indicator can be used in place of the status words to indicate the status of a call where the indicator takes on different colors depending on the status of the call. This would allow more status indicators to be placed in the feedback interface allowing the manager to monitor more calls at once. In other embodiments, the communication professional's name is used in place of the extension.

Note that the interface of FIG. 10 allows a manager to monitor a large number of calls without having to listen in on the calls. Thus, the manager is able to get a better indication of how the communication professionals are performing at any given time.

Although the user interface of FIG. 10 only shows the status as being either OK or Warning, in other embodiments, the classification of the conversation can be displayed. For example, if the conversation was classified as being Accent Unintelligibility, that status would appear in the status box.

In FIG. 11, the monitoring interface is shown with a details area 1120 displayed, which is produced when the manager clicks on one of the status boxes in the call monitoring display. In the details area, the name of the communication professional is provided in an entry 1100 and the length of the call is provided in an entry 1102. Short-term status and long-term status are also provided as entries 1104 and 1106 and a button 1108 is provided to allow the manager to listen in on the call. The timeline 1109 can show features of the call over time (e.g., level of abnormality, amount of speech from each participant, etc.) using various colors/patterns. Note that there could be multiple timelines displaying different features over time. In the embodiment of FIG. 11, a product 1110 is shown, which is the subject of the call as determined from the customer relations management server.

Figure 12:
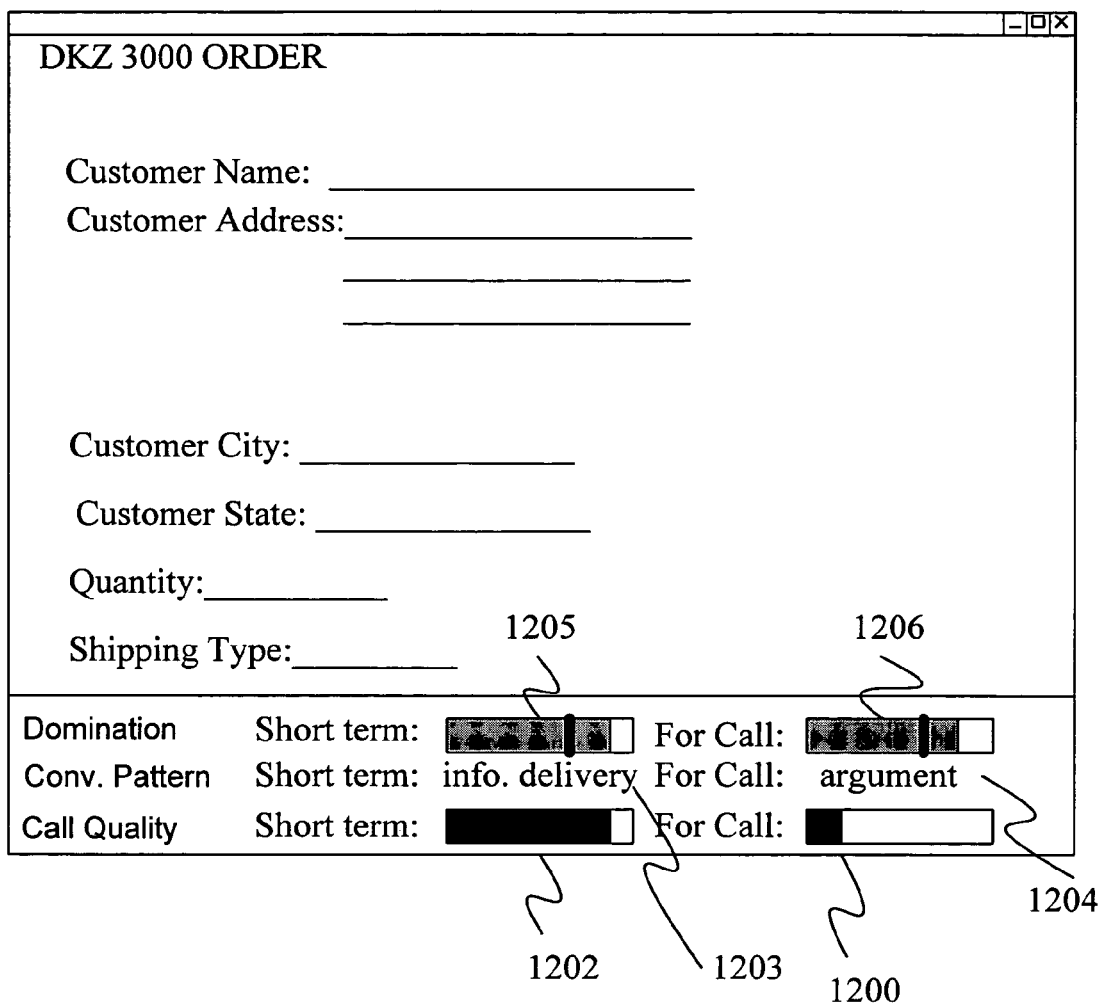
FIG. 12 is a screen shot of a window for a communication professional that provides feedback on the communication.

The conversation analysis can also be used to provide real-time feedback to the communication professional. This feedback can be provided in a visual way through a user interface such as the user interface of FIG. 12. As with the call monitoring interface, the feedback provided to the communication provider can be divided into feedback over the short-term and feedback for the entire call. In the embodiment of FIG. 12, this feedback takes the form of status bars showing the call quality, the labels of the short-term/long term conversation category, and the level of domination by the user (in this case, a support professional). For example, in entry 1200 of the interface, the partially-filled status bar implies that the conversation as a whole is not of very high quality. In entry 1202, a mostly filled bar indicates that the recent part of the conversation is good according to the "good" conversation model. These levels can be computed based on the distance of the short term/entire call's features from the "good" conversation model. In addition, the category labels 1203 and 1204 tell the user that the current conversation matches the "Information Delivery" pattern for the short term, but the "Argument" pattern for the call as a whole. Finally, the domination level indicators 1205 and 1206 show what fraction of time the user has been dominating the interaction in the short and long term. The solid black line represents the "ideal" level of domination, as determined from training data of "good" calls. All of these indicators allow the communication professional to adjust their behavior to try to bring the conversation back toward the good model for conversations. Note that many other features/information types that we have discussed above could also be displayed as feedback; these are just meant to be a representative sampling.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium having computer-executable instructions for performing steps comprising:

generating a feature that is based on speech signals from at least two participants in a conversation held over an electronically recordable channel, the feature comprising a feature from a group of features consisting of: speaking rate of each participant, energy of speech of each participant, amount of overlapping speech, number of times a different participant begins to speak, number of interruptions, identity of dominant participant, and length of pauses in the speech of the participants;

identifying a deviation between the feature and a conversation model;

applying the deviation to a plurality of deviation models to identify which model best matches the identified deviation; and classifying the conversation into one of a number of categories based on a label associated with the deviation model that best matches the identified deviation.

2. The computer-readable storage medium of claim 1 further comprising displaying an item that is representative of the value of the feature.

3. The computer-readable storage medium of claim 1 further comprising providing an indication of the classification of the conversation to a monitoring application.

4. The computer-readable storage medium of claim 3 wherein the monitoring application provides visual indications of the classifications of a plurality of conversations.

5. The computer-readable storage medium of claim 4 wherein the visual indications of the classifications of the plurality of conversations are provided while the conversations are in progress.

* * * * *